United States Patent [19]

Baird

[11] 4,294,169
[45] Oct. 13, 1981

[54] COTTON MODULE COMPACTER

[76] Inventor: Charles D. Baird, P.O. Box 976, Coleman, Tex. 76834

[21] Appl. No.: 117,826

[22] Filed: Feb. 4, 1980

[51] Int. Cl.³ .............................................. B30B 15/30
[52] U.S. Cl. ....................................... 100/48; 100/53; 100/99; 100/100; 100/215; 100/255; 100/256; 100/295
[58] Field of Search ............... 100/100, 255, 215, 295, 100/218, 53, 256, 99, 43, 48; 141/71, 73, 80

[56] References Cited

U.S. PATENT DOCUMENTS

| | | | |
|---|---|---|---|
| 232,260 | 9/1880 | Grizzel . | |
| 262,043 | 8/1882 | Herring . | |
| 306,971 | 10/1884 | Steele | 100/215 |
| 1,003,382 | 9/1911 | Stopple | 100/255 |
| 1,235,094 | 7/1917 | Barker . | |
| 1,313,228 | 8/1919 | Minnich | 100/255 |
| 1,646,355 | 10/1927 | Hill . | |
| 2,734,439 | 2/1956 | Padrick . | |
| 2,763,117 | 9/1956 | Wagnon . | |
| 2,783,701 | 3/1957 | Padrick . | |
| 2,785,810 | 3/1957 | Kneib . | |
| 2,842,899 | 7/1958 | Padrick . | |
| 2,848,940 | 8/1958 | Jonsson . | |
| 2,857,724 | 10/1958 | Kenney . | |
| 2,909,264 | 10/1959 | Kneib . | |
| 3,002,574 | 10/1961 | Padrick . | |
| 3,098,530 | 7/1963 | Kenney . | |
| 3,099,952 | 8/1963 | Dixon . | |
| 3,385,043 | 5/1968 | Seymore . | |
| 3,437,033 | 4/1969 | Day | 100/215 |
| 3,548,744 | 12/1970 | Van Doorn . | |
| 3,556,327 | 1/1971 | Garrison | 100/218 |
| 3,593,835 | 7/1971 | Kneib . | |
| 3,595,282 | 7/1971 | Fishburne | 100/215 |
| 3,749,003 | 7/1973 | Wilkes . | |
| 3,805,693 | 4/1974 | Neitzel . | |
| 3,895,572 | 7/1975 | Nitschke . | |
| 3,937,140 | 2/1976 | Swanson . | |
| 3,941,047 | 3/1976 | Orlando . | |
| 3,955,492 | 5/1976 | Topolay . | |
| 3,985,072 | 10/1976 | Van Doorn . | |
| 4,060,028 | 11/1977 | Luscombe | 100/100 |
| 4,081,094 | 3/1978 | Pereira . | |

FOREIGN PATENT DOCUMENTS

223732 9/1959 Australia .............................. 100/100

*Primary Examiner*—Billy J. Wilhite
*Attorney, Agent, or Firm*—Richards, Harris & Medlock

[57] ABSTRACT

A vehicle towable cotton module compacter (10) is disclosed for use in the cotton field on seed cotton. A rigid framework (12) has upper and lower rectangular frames (28, 22). The upper frame (28) has a hopper (88) with an open top mouth (90). The hopper (88) has a collection box (92) with a push plate (96) for discharging collected cotton rearwardly through an opening (94) into a vertical compaction chamber (30). The chamber (30) is formed by a stationary vertical front wall (32) and a pair of L-shaped doors (40, 42) hinged along vertical axes at their forward edges. The longitudinal sides (44, 46) of the doors (40, 42) form the right and left sidewalls of the compaction chamber (30), and the lateral sides (48, 50) of the doors (40, 42) each form half of the rear wall of the chamber (30). The left, right and rear chamber walls are tapered outwardly as they extend downwardly. The upper frame (28) includes tamper means (108) mounted above the compaction chamber (30). A tamper foot (120) has a plurality of parallel horizontal toes (124) vertically reciprocal into the compaction chamber (30) by a central vertical hydraulic cylinder (116). The tamper foot (120) is guided by guide poles (130, 132) and guide plates (126, 128) on opposite lateral sides of the hydraulic cylinder (116) for registered movement of the tamper foot (120) and aligned compaction of cotton within the chamber (30). The bottom wall of the compaction chamber (30) is formed by a horizontal pallet (52) movably carried on a conveyor (134) for rearward discharge of the compacted cotton module through opened doors (40, 42).

41 Claims, 3 Drawing Figures

COTTON MODULE COMPACTER

TECHNICAL FIELD

The present invention relates to a cotton compacter for compressing seed cotton into a compact module in the field.

BACKGROUND OF THE INVENTION

Cotton compacters for use in a cotton field are known. These compacters are portable units usually towed by a tractor or the like between different locations in the cotton field or between different cotton fields. The compacter compresses seed cotton into a compact module. This module is subsequently transported to the cotton gin.

Examples of the above type compacters are shown in Wilkes et al U.S. Pat. No. 3,749,003 and Orlando et al U.S. Pat. No. 3,941,047. These compacters have rectangular frames open at the top and bottom. A compacting mechanism or carriage is mounted for movement longitudinally along the top of the frame. The compacting mechanism has a vertically reciprocal compaction head for compressing the cotton into a compact module which can be left in the field when the compacter is moved to a new location. The module may sit directly on the ground or on a pallet resting on the ground. The module passes through a doorway in the rear of the compacter as the compacter is advanced forwardly. This doorway is provided by a rear door hinged at the top.

While the Wilkes et al and Orlando et al compacters have been useful for their intended purposes, they are bulky and cumbersome. Specialized reinforcement problems must be addressed in order to maintain structural integrity. For example, Orlando et al deals with a particular side frame structure to increase structural rigidity. Orlando et al provides a triangular sidewall beam which provides high torsional resistance and minimizes horizontal deflections at the base of the compacter, especially when the rear door of the compacter is open as when the cotton module is being deposited in the field. Orlando et al further deals with problems regarding difficulty in opening and closing the rear door due to various bending stresses causing binding of the door. Orlando et al further deals with constraints upon portability of the compacter which can present a safety hazard even at low towing speeds.

SUMMARY OF THE INVENTION

The present invention provides a seed cotton compacter of significantly simplified structure providing both structural integrity and enhanced compaction characteristics.

In one aspect of the invention, a rigid frame structure is provided.

In another aspect of the invention, a vertical compaction chamber is provided with a vertically reciprocal tamper foot for compressing seed cotton therein. There is further provided efficient gate discharge structure for rearward horizontal discharge of the compacted cotton module. In preferred form, the compaction chamber is formed by a front wall and a pair of L-shaped doors. Each door extends rearwardly from the front wall and then inwardly to abut the facing edge of the other door. Each door forms a left or right sidewall and half of the rear wall of the compaction chamber. Each door is hinged at its forward vertical edge to pivot about a vertical axis.

In another aspect of the invention, a bottom horizontal wall of the compaction chamber is formed by a pallet advanced rearwardly by a conveyer feeder and discharge mechanism for efficient rearward discharge of the compacted cotton module. There is further provided rearward advancement of a replacement pallet for compaction of the next module without relocation of the compacter.

In another aspect of the invention, a pyramid-type pack is provided in the vertical compaction chamber. The doors are tapered rearwardly and laterally outwardly as they extend from top to bottom. In preferred form, upper and lower door supports are provided with different lateral dimensions between the door and the vertical pivot axis.

In another aspect of the invention, the tamper foot is provided with driving and guiding structure enabling incorporation of sensor means to sense when the compacted cotton reaches a predetermined height within the compaction chamber.

In another aspect of the invention, efficient hopper means are provided for facilitating loading of the cotton from the field into the compaction chamber.

In another aspect of the invention, retractable deflection means is provided for facilitating better packing distribution within the compaction chamber.

In another aspect of the invention, the structural combination and interaction of the components enables the incorporation of various sensor elements for providing indications of designated conditions.

In another aspect of the invention, a compacter is provided which is portable and safely towable.

Other aspects and advantages will become apparent hereinafter.

DETAILED DESCRIPTION

Figure 1:
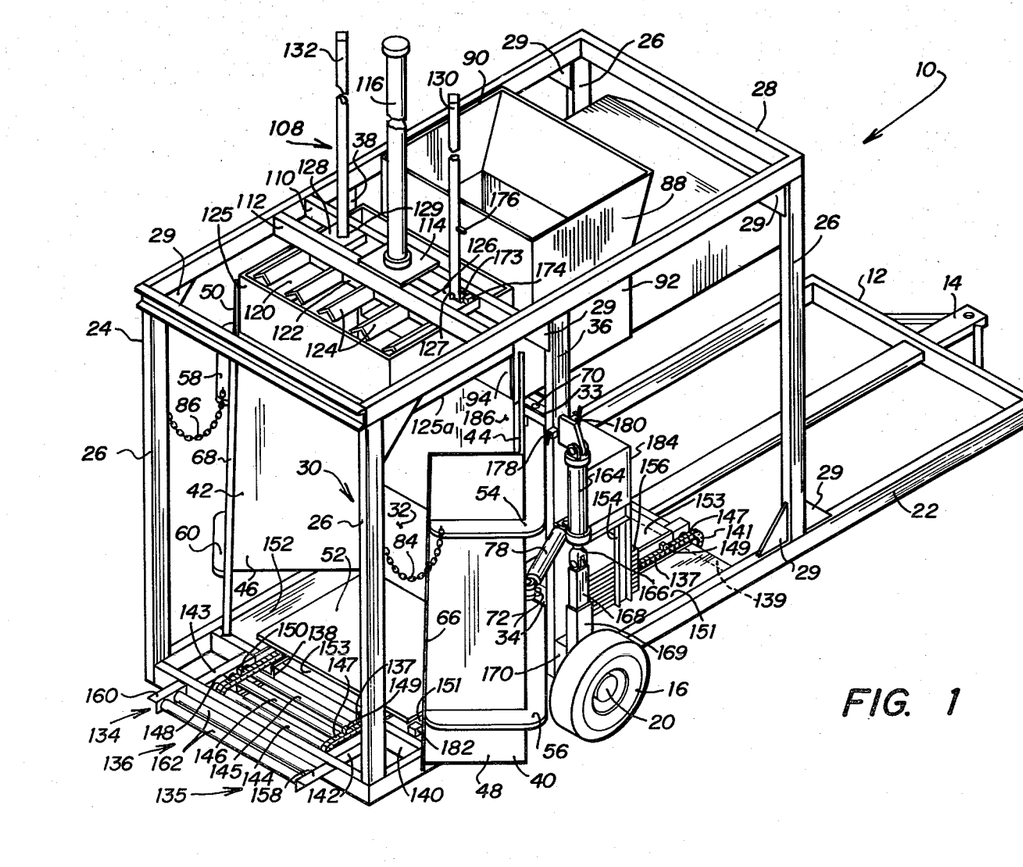
FIG. 1 is an isometric view of the preferred embodiment of a cotton module compacter constructed in accordance with the invention.

There is shown in FIG. 1 a cotton module compacter, generally designated 10, for compacting seed cotton into compressed modules. The compactor comprises a portable frame 12 having a hitch 14 and wheels 16 and 18. Each wheel is rotatably mounted to the frame by axle means, such as 20. Frame 12 is a rigid structure having a lower horizontal rectangular section 22 and a box section 24. The box section 24 is comprised of a plurality of upstanding vertical supports 26 and an upper horizontal rectangular section 28. Various triangular braces 29 are provided for extra rigidity.

Mounted to the frame is means defining a vertical compaction chamber 30. This chamber has a stationary front wall 32 supported between an upper crosspiece 33 and a lower crosspiece 34. These crosspieces 33 and 34 extend laterally between central vertical supports 36 and 38. The left and right sidewalls and the rear walls of the compaction chamber are formed by a pair of L-shaped doors 40 and 42. These doors are shown in open position in FIG. 1.

Figure 3:
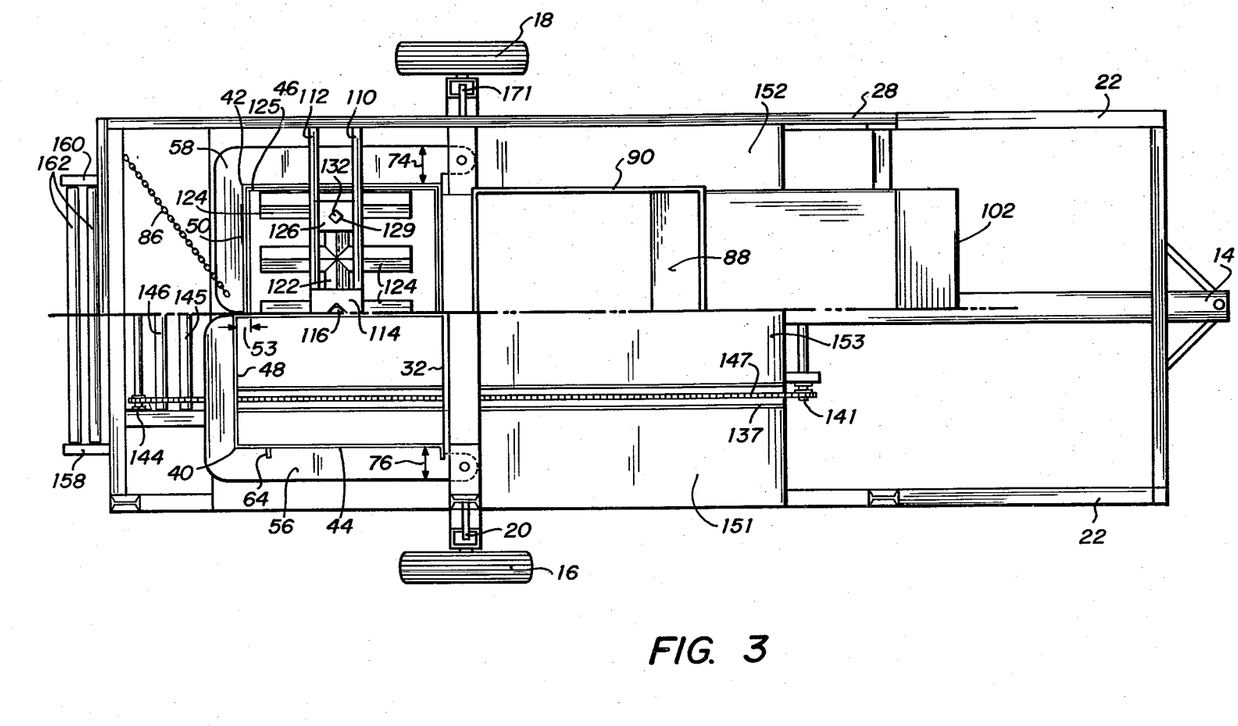
FIG. 3 is a partial top elevation and partial cross section view of the compacter of FIG. 1.

The upper half of FIG. 3 shows a view in elevation from a point above the compacter. The lower half of FIG. 3 shows a sectional view taken near the bottom of door 40. FIG. 3 shows the doors in closed position. The right sidewall of compaction chamber 30 is formed by longitudinal leg 44 of door 40. The left sidewall of the compaction chamber is formed by longitudinal leg 46 of door 42. The rear wall of the compaction chamber is formed by lateral legs 48 and 50 of doors 40 and 42, respectively. Leg 48 forms the right half of the rear wall, and leg 50 forms the left half of the rear wall. The bottom wall of the compaction chamber is formed by horizontal pallet 52. The top of the compaction chamber is open.

Figure 2:
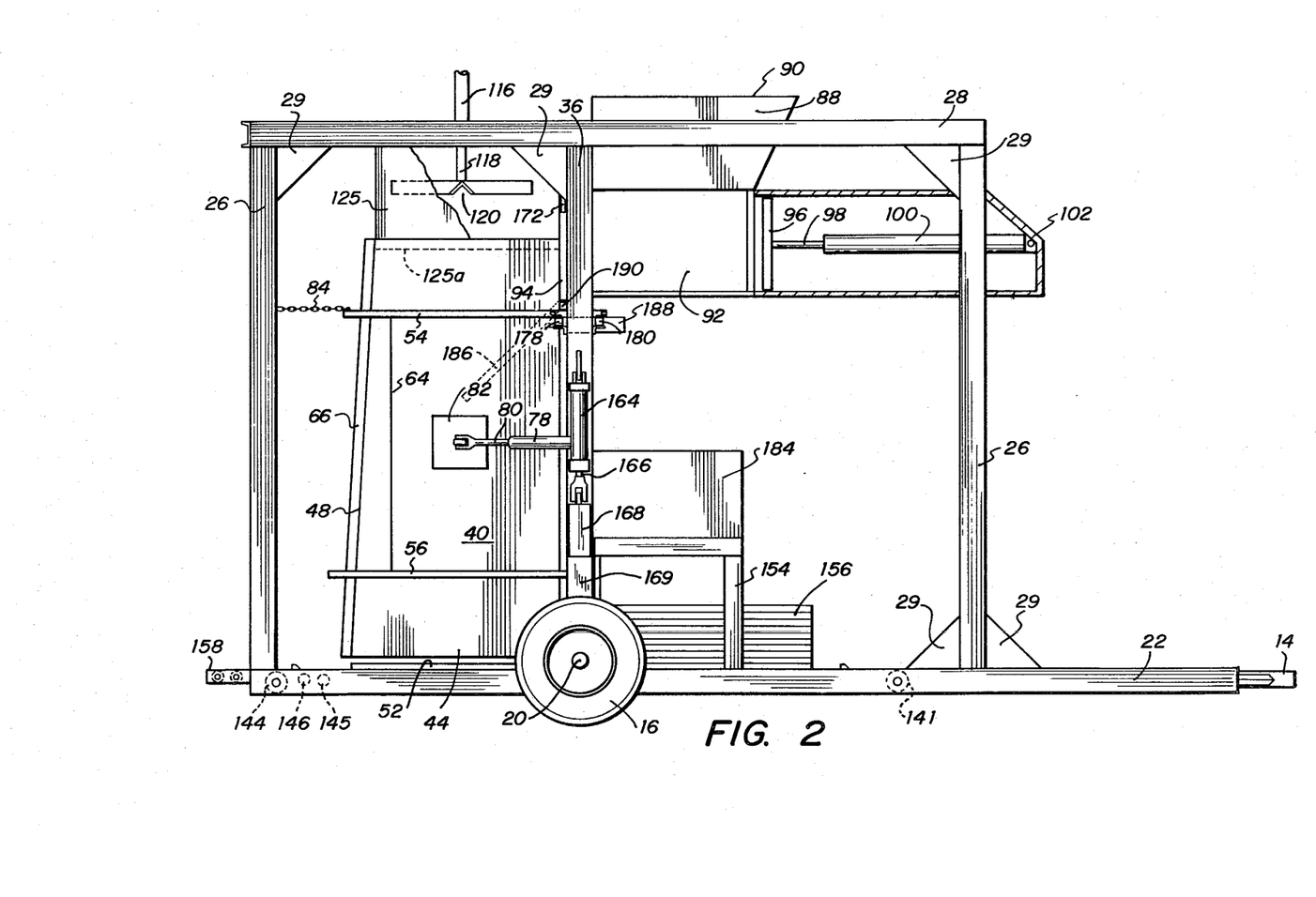
FIG. 2 is a side elevation view of the compacter of FIG. 1.

The rear wall of the compaction chamber is tapered rearwardly as it extends downwardly. FIG. 3 shows this tapering by illustrating the longitudinal displacement 53 between the top of door leg 50 and the bottom of door leg 48. This rearward tapering is also shown in FIG. 2 for door leg 48. In preferred form, doors 40 and 42 are approximately eight feet high, and the amount of rearward taper, i.e., the dimension of span 53, is about five inches.

A pair of L-shaped supports are provided for each door for mounting to the frame. Supports 54 and 56 are welded to the exterior of door 40, and supports 58 and 60 are welded to the exterior of door 42. The forward ends of the longitudinal legs of upper right and left supports 54 and 58 are pivotally mounted to upper crosspiece 33. The forward ends of the longitudinal legs of lower supports 56 and 60 are pivotally mounted to lower crosspiece 34. The doors preferably have one or more structural members such as 64 extending vertically along the exterior thereof between the L-shaped supports. The ends of lateral legs 48 and 50 of the doors are flared rearwardly along their entire vertical extension to provide interfaces 66 and 68, respectively, which engage in the closed position of the doors.

Referring to FIG. 1, door 40 is pivotally mounted to the frame at upper and lower pivot points 70 and 72. Upper L-shaped support 54 is pivotally attached at 70 to upper crosspiece 33. Lower L-shaped support 56 is pivotally attached at 72 to lower crosspiece 34. Pivot points 70 and 72 are vertically aligned, i.e., spaced laterally leftwardly inwardly equal distances from central vertical support 36. L-shaped supports 58 and 60 for the left door 42 are comparably mounted.

The right and left sidewalls of the compaction chamber are tapered outwardly as they extend downwardly. Taper is provided by the L-shaped supports 54, 56, 58 and 60. The lateral dimension of upper L-shaped support 54 is wider than the lateral dimension of lower L-shaped support 56. L-shaped supports 58 and 60 are similar, with a variant lateral dimension therebetween. This is illustrated in FIG. 3 wherein the lateral dimension 74 of upper left L-shaped support 58 is wider than the lateral dimension 76 of lower right L-shaped support 56. Alternatively, the lateral dimensions of the upper and lower L-shaped supports may be the same, and the upper and lower door pivots, e.g., 70 and 72, may be laterally offset to provide the desired taper. In preferred form, with eight foot high doors, each sidewall is tapered outward a total of about two inches laterally. The combination of the tapered left and right sidewalls 46 and 44 and the tapered rear wall formed by half-sections 48 and 50 provides a pyramid-type pack. This enhances compaction of cotton within the chamber.

The doors are preferably actuated between open and closed positions by hydraulic cylinders. FIGS. 1 and 2 show the hydraulic cylinder 78 for door 40. Door 42 has a comparable cylinder arrangement. Cylinder 78 is pivotally mounted to vertical support 36 and has a reciprocal plunger 80 pivotally mounted to a plate 82 which is welded to longitudinal leg 44 of door 40. Extension of the plunger 80 closes the door 40. Retraction of the plunger 80 opens the door 40 such that interface edge 66 is laterally outward of the rearward longitudinal discharge path of the compacted cotton module, to be more fully described hereinafter. Retaining chains 84 and 86 may be provided for doors 40 and 42. These chains are mounted at one end to respective corner vertical supports 26 and at the other end to respective lateral door legs 48 and 50 to limit the range of motion of doors 40 and 42 upon closure and to prevent overlap.

Upper section 28 of the frame has a hopper 88 mounted forwardly of and above compaction chamber 30. The hopper has a top open mouth 90 for directly receiving pre-processed cotton. The hopper has a collection box 92 with a rear opening 94 for discharge into the compaction chamber. Forwardly of the collection area within box 92 is a longitudinally reciprocal push plate 96, FIG. 2, mounted to a plunger 98 of hydraulic cylinder 100. This cylinder is anchored at its forward end to a front wall 102 of the hopper assembly. Extension of plunger 98 moves push plate 96 rearwardly to push the cotton in collection box 92 through opening 94 into vertical compaction chamber 30.

Tamper means 108 is mounted to upper frame section 28 above compaction chamber 30. A pair of parallel support bars 110 and 112 extend laterally across the upper frame. A central mounting plate 114 bridges these support bars and rigidly mounts a hydraulic cylinder 116 which extends vertically upward. This cylinder has a vertically reciprocal plunger 118 extending downwardly and attached to a multi-toed tamper foot 120. This tamper foot has a central lateral cross support 122 with a plurality of parallel toes 124 extending longitudinally thereacross. The cross support 122 and each of the toes 124 are apexed upwardly to form a shallow inverted V-shape in vertical cross section.

A box-like shroud 125, open at its top and bottom, is mounted at the top edges of its sidewalls to the undersides of support bars 110 and 112. Cotton from collection box 92 is discharged through opening 94 below the lower extension 125a of shroud 125. Tamper foot 120 reciprocates through shroud 125.

Rigidly mounted to and bridging support bars 110 and 112 are a pair of guide plates 126 and 128 on opposite lateral sides of central plate 114. These guide plates have diamond shaped apertures 127 and 129 for slidably receiving vertically upstanding diamond shaped guide poles 130 and 132. These guide poles are rigidly secured at their lower ends to cross support 122 of the tamper foot.

FIGS. 1 and 2 show plunger 118 in its retracted position with tamper foot 120 above compaction chamber 30. Extension of plunger 118 lowers tamper foot 120 downwardly into the compaction chamber with guide poles 130 and 132 sliding through apertures 127 and 129 in guide plates 126 and 128. The multiple toe arrangement of the tamper foot provides enhanced compaction of cotton within the compaction chamber.

Conveyer means 134 is mounted to the lower frame section 22 for rearwardly conveying pallet 52 which forms the bottom wall of compaction chamber 30. This effects rearward discharge of the compacted cotton module through open doors 40 and 42. A pair of laterally spaced support tracks 135 and 136 are provided for the pallet. These support tracks are mounted to the frame below the compaction chamber and extend longitudinally forwardly and rearwardly thereof. Support tracks 135 and 136 include a pair of parallel longitudinal channel-shaped runners 137 and 138 rigidly secured to lower frame section 22 by means of lateral supports such as 139 and 140. Mounted forwardly of lateral support 139 is a sprocketed driving roller 141. Extending rearwardly from lateral support 140 are a pair of extensions 142 and 143 between which are mounted a sprocketed roller 144 and an additional pair of rollers 145 and 146.

A pair of laterally spaced endless drive chains 147 and 148 are received on sprocketed rollers 141 and 144. These chains extend through channel-shaped runners 137 and 138. Drive chains 147 and 148 have a plurality of spaced hooks 149 and 150 for engaging the front edge of a pallet and driving it rearwardly in response to driving rotation of roller 141.

Conveyor means 134 further includes horizontal plates 151, 152, and 153. Plate 151 extends between the right longitudinal side of lower frame section 22 and longitudinal channel-shaped runner 137. Plate 152 extends between the left longitudinal side of lower frame section 22 and longitudinal channel-shaped runner 138. Plate 153 extends between runners 137 and 138. The top surfaces of plates 151, 152 and 153 are co-planar, which plane is slightly above chains 147 and 148 but slightly below the upper reach of hooks 149 and 150.

Each of the plates 151 and 152 has a vertical post extending upwardly therefrom such as 154 to provide pallet stacking guide means. A plurality of horizontal pallets 156 are vertically stacked at a position forwardly of front wall 32 of the compaction chamber 30. The bottom edge of front wall 32 is spaced above the co-planar top horizontal surfaces of plates 151, 152 and 153 by a vertical distance slightly greater than the height of a single pallet. Chains 147 and 148 pass freely under stacked pallets 156 until a pair of hooks 149 and 150 engage the front edge of the lowermost pallet in the stack. The hooks then drive this lowermost pallet rearwardly beneath front wall 32 to the position of pallet 52 shown in FIG. 1. The chain hooks which had driven pallet 52 to its position below the compaction chamber concurrently drive pallet 52 rearwardly with the compacted cotton module thereon through open doors 40 and 42.

Longitudinal extensions 158 and 160 may be provided at the rear of lower frame section 22. Parallel rollers 162 may extend laterally between extensions 158 and 160. The lateral span of rollers 162 is greater than the lateral width of pallet 52 such that the pallet engages and rides on rollers 162 for ease of discharge.

Wheels 16 and 18 may be lowered and raised by elevation driver means, such as hydraulic cylinders. Right hydraulic cylinder 164 is anchored at its upper end to central vertical support 36 and has a vertically reciprocal plunger 166. The lower end of plunger 166 is connected to a rectangular tubular plunger 168. A rectangular tubular shell or sleeve 169 is rigidly attached to support 36 by block 170 and telescopically receives plunger 168. The lower end of rectangular plunger 168 is secured to axle means 20. The left hydraulic cylinder is comparable and is similarly connected to the axle means 171 for wheel 18.

A particularly advantageous aspect of the structure of the preferred embodiment is its amenability to placement of sensor devices for automatic or semi-automatic operation. A limit switch 172, FIG. 2, may be disposed adjacent opening 94. The actuating arm of the limit switch is disposed in the path of motion of push plate 96 for sensing when the plate has completed a rearward stroke, discharging the contents of hopper 88 into the compaction chamber 30. Such indication may be used, for example, to initiate actuation of tamper means 108.

Tamper cylinder 116 may be of the pressure relief type wherein plunger 118 is retracted upon a predetermined reactive pressure thereagainst. The tamper foot 120 may thus cycle reciprocally as cotton builds up within compaction chamber 30 upon each discharge from hopper 88. As the height of the compacted cotton module grows higher, the tamper foot goes through decreasingly shorter vertical travel strokes. Guide plate 126 may have a recessed aperture 173, FIG. 1, formed therethrough extending from the main aperture 127. A limit switch 174 may be mounted on guide plate 126 with the actuating arm of the limit switch extending out over the recessed aperture 173.

Attached to guide pole 130 is a lateral actuating projection 176 having a vertical path of motion through the recessed aperture 173 of plate 126 and intersecting the actuating arm of limit switch 174. Projection 176 normally trips switch 174 during downward travel of the tamper foot. As the height of the module increases, and the tamper foot has shorter strokes, a point is reached where projection 176 does not travel downwardly far enough to trip switch 174. This non-tripped condition of limit switch 174 during a cycle stroke of the tamper foot thus indicates that a predetermined module height has been reached. This sensed height indication is a valuable piece of information because it may be used, for example, as a signal for the opening of the doors. It may also be used as a signal for advancement of the conveyor means to discharge pallet 52 with the compacted cotton module thereon, and to advance the next pallet into its place.

A limit switch 178 can be mounted on support 36 with its actuating lever arm in the path of motion of L-shaped support 54 for sensing open and closed positions of door 40. A comparable limit switch may be provided for door 42. Limit switch 178 can sense both the open and closed positions of door 40. Alternatively, a second limit switch 180 can be used to sense an open door position, with switch 178 sensing a closed door position. These sensed open and closed door conditions can be beneficially used, for example, to disable rearward movement of pusher plate 96 and downward movement of tamper foot 120 when the doors are open. Another use is to prevent conveyor means advancement when the doors are closed.

A limit switch 182, FIG. 1, may be mounted to plate 151. The actuating lever arm of limit switch 182 may be disposed in the discharge path of motion of pallet 52 for sensing whether pallet 52 is in a state of discharge or is in proper position to form the bottom wall of compaction chamber 30.

A hinged deflection plate 186, FIGS. 1 and 2, is mounted below discharge opening 94 near the top of compaction chamber 30. Plate 186 is hingedly mounted along its top edge to front wall 32 and spans the width of the compaction chamber. FIG. 1 shows plate 186 in a retracted, vertical position flush with front wall 32. FIG. 2 shows the plate (in dashed line) in an extended position pivoted about its top edge away from front wall 32 by about 45° and into the compaction chamber. Driver means, such as hydraulic cylinder 188 mounted to crosspiece 33, drives plate 186 between its retracted and extended postions. A limit switch 190 is provided for sensing the position of plate 186.

Plate 186 is in its extended position when doors 40 and 42 are closed and tamper foot 120 is in its upper position. As push plate 96 pushes cotton through discharge opening 94, the cotton will fall into the compaction chamber and be deflected towards the middle by deflection plate 186. The indication from switch 172 of the completion of a rearward discharge stroke of push plate 96 may be used to initiate actuation of cylinder 188 to retract deflection plate 186. Limit switch 190 senses retraction of plate 186 and this indication may be used to enable initiation of tamper means 108.

Plate 186 has been found particularly beneficial in the compaction of ginned seed cotton. A ginning operation removes the bulk of the cotton from around a seed. However, there is still left a slight amount of cotton lint clinging to the seed. This lint can be compressed, which saves storage space and increases transport efficiency. The deflection plate 186 prevents the seeds from bunching up near the front of compaction chamber 30 and provides a more uniform pack.

Seed cotton before it is ginned still has the bulk of the cotton around the seed, and there is not as much of a tendency to bunch up at the front of the compaction chamber even if deflection plate 186 is omitted. Deflection plate 186 is preferred, however, for better distribution.

A motor control housing 184 is provided on the frame for convenient mounting of electric motor and hydraulic power units, reservoirs, and the like, when automatic and/or power actuated operation is used with the invention.

It is recognized that various modifications are possible within the scope of the appended claims.

I claim:

1. A seed cotton compacter for field use comprising in combination;
   a frame;
   a vertical compaction chamber mounted to said frame and including door means pivotal about a vertical axis between open and closed positions;
   tamper means mounted to said frame above said compaction chamber and vertically reciprocal for tamping seed cotton in said compaction chamber into a compact module with said door means in said closed position, said door means in said open position permitting horizontal discharge of said compact module; and
   said door means comprising a pair of L-shaped doors forming in said closed position left, and right and rear generally vertical walls of said compaction chamber, said doors forming said left, right and rear walls of said compaction chamber being tapered outwardly and rearwardly from top to bottom, each door being pivotally mounted to said frame at its forwrd vertical edge and extending rearwardly to define a respective right or left sidewall, and then inwardly to define part of the rear wall and meet the facing edge of the other door.

2. A seed cotton compacter for field use comprising in combination:
   a frame;
   a vertical compaction chamber mounted to said frame and including door means pivotal about a vertical axis between open closed positions;
   tamper means mounted to said frame above said compaction chamber and vertically reciprocal for tamping seed cotton in said compaction chamber into a compact module with said door means in said closed position, said door means in said open position permitting horizontal discharge of said compact module;
   conveyor means mounted to said frame and carrying a pallet to a position below said compaction chamber to form a generally horizontal bottom wall of said compaction chamber, said conveyor means advancing said pallet rearwardly with said compact cotton module thereon through said door means in said open position;
   said door means comprising a pair of L-shaped doors forming in said closed position left, right and rear generally vertical walls of said compaction chambers, each door being pivotally mounted to said frame at its forward vertical edge and extending rearwardly to define a respective right or left sidewall and then inwardly to define part of the rear wall and meet the facing edge of the other door.

3. A seed cotton compacter for field use comprising in combination:
   a frame;
   a vertical compaction chamber mounted to said frame and including door means pivotal about a vertical axis between open and closed positions, said door means comprising a pair of L-shaped doors forming in said closed position left, right and rear generally vertical walls of said compaction chamber, each door being pivotally mounted to said frame at its forward vertical edge and extending rearwardly to define a respective right or left sidewall and then inwardly to define part of the rear wall and meet the facing edge of the other door;
   tamper means mounted to said frame above said compaction chamber and vertically reciprocal for tamping seed cotton in said compaction chamber into a compact module with said door means in said closed position, said doors means in said open position permitting horizontal discharge of said compact module;
   a pair of door supports for each door, each pair of said door supports comprising an upper and a lower door support extending laterally outwardly from said door adjacent said forward edge thereof and pivotally secured to said frame, the upper and lower pivot point attachments of said upper and lower door supports to said frame being vertically coaxial and the lateral dimension of said upper door support between its pivot point and said door being greater than the lateral dimension of said lower door support between its pivot point and said door.

4. The invention according to claim 1 or claim 2 further comprising hopper means mounted to said frame for receiving seed cotton and having a discharge opening above said compaction chamber and below said tamper means when the latter is at the top of its vertical travel stroke.

5. The invention according to claim 4 further comprising a pusher plate mounted to said frame for discharging cotton in said hopper means into said compaction chamber.

6. The invention according to claim 2 further comprising retractable deflection means within said compaction chamber below said discharge opening for deflecting seed cotton discharged from said discharge opening into said compaction chamber.

7. The invention according to claim 6 wherein said discharge opening is above a front wall of said compaction chamber, and wherein said retractable deflection means comprises a hinged deflection plate having a retracted position substantially flush with said front wall and an extended position pivoted about its top edge away from said front wall and into said compaction chamber.

8. The invention according to claim 7 further comprising:
driver means actuatable to move said deflection plate between said retracted and extended positions; and
sensor means responsive to the completion of a discharge cycle by said hopper means to initiate actuation of said driver means to move said deflection plate from said extended position to said retracted position, and responsive to said retracted position of said deflection plate to enable actuation of said tamper means for vertical reciprocation thereof.

9. The invention according to claim 1 or claim 2 wherein said tamper means comprises:
support bar means rigidly secured to said frame;
hydraulic cylinder means rigidly secured to said support bar means and extending vertically upwardly therefrom and having a vertically reciprocal plunger with a lower end below said support bar means; and
a tamper foot secured to said plunger at the lower end thereof.

10. The invention according to claim 9 wherein said tamper means further comprises:
a pair of guide poles extending vertically upwardly from said tamper foot from opposite sides of said plunger and slidingly received through said support bar means.

11. The invention according to claim 2 wherein:
said compaction chamber has a front wall rigidly secured to said frame with a bottom edge spaced above said conveyer means;
said frame includes pallet stacking means forwardly of said front wall of said compaction chamber for receiving and stacking a plurality of pallets; and
said conveyer means advances the bottom pallet in said stack rearwardly below said front wall of said compaction chamber to a position below said compaction chamber to form said bottom wall thereof.

12. The invention according to claim 11 wherein:
said conveyer means comprises:
support track means mounted to said frame below said compaction chamber and extending longitudinally forwardly and rearwardly thereof; and
longitudinal chain driven advancement means guided by said support track means;
said pallets rest on said support track means;
said chain driven advancement means engages the front edge of said pallet forming said bottom wall of of said compaction chamber and drives it rearwardly with said compacted cotton module thereon through said doors in said open position to discharge said module; and
said chain driven advancement means engages the front edge of said bottom pallet in said stack and drives it rearwardly to replace said last mentioned discharged pallet and form the bottom wall of said compaction chamber for the next cotton module.

13. A seed cotton compacter for field use comprising in combination:
a portable longitudinal frame;
hopper means mounted to said frame and having an open mouth for receiving seed cotton and having a rearward discharge opening;
a vertical compaction chamber mounted to said frame rearwardly of and below said discharge opening of said hopper means, said compaction chamber comprising:
an open top;
a front wall rigidly secured to said frame; and
door means forming left and right sidewalls and a rear wall of said compaction chamber, said door means being pivotal about a vertical axis between open and closed positions;
tamper means mounted to said frame above said compaction chamber and vertically reciprocal therein with an uppermost position spaced above said discharge opening of said hopper means, said tamper means tamping seed cotton discharged from said hopper means to said compaction chamber into a compact module with said door means in said closed position; and
conveyer means mounted to said frame and carrying a pallet to a position below said compaction chamber to form a horizontal bottom wall of said compaction chamber, said conveyer means carrying said pallet rearwardly with said compact cotton module thereon through said door means in said open position.

14. The invention according to claim 13 wherein said tamper means comprises:
compaction driver means rigidly secured to said frame; and
a tamper foot driven in vertical reciprocation in said compaction chamber by said compaction driver means, the vertical travel stroke of said tamper foot decreasing as the height of the cotton module in said compaction chamber increases;
and further comprising sensor means sensing a predetermined short travel stroke of said tamper foot indicating a predetermined height of the compacted cotton module in said compaction chamber.

15. The invention according to claim 14 wherein said sensor means is mounted to said frame above said compaction chamber.

16. The invention according to claim 15 comprising:
a vertical guide pole extending upwardly from said tamper foot;
trip means extending laterally from said guide pole and vertically spaced above said tamper foot;
said sensor means comprising electrical switch means mounted to said frame between said tamper foot and said trip means when said tamper means is in the uppermost position;
said electrical switch means having an actuator extending into the path of motion of said trip means such that said trip means trips said switch means during downward travel of said tamper foot below a given cotton module height; and
a non-tripped condition of said switch means at the bottom of the travel stroke of said tamper foot indicating said predetermined height of said cotton module.

17. The invention according to claim 14 wherein:

said frame has rigid support bar means extending across and above said compaction chamber;

said compaction driver means comprises a hydraulic cylinder rigidly secured to said support bar means and extending vertically upwardly therefrom and having a vertically reciprocal plunger therein with a lower end below said support bar means;

said tamper foot is secured to said lower end of said plunger and has guide pole means extending vertically upwardly therefrom slidably through said support bar means for vertical reciprocation therethrough and registered aligned guidance thereby;

said sensor means comprises a limit switch attached to said support bar means with an actuator lever arm extending laterally therefrom; and said guide pole means has trip means secured thereto and engagable with said actuator lever arm of said limit switch.

18. The invention according to claim 13 wherein said tamper means comprises compaction driver means rigidly secured to said frame and driving a tamper foot vertically downwardly into said compaction chamber, said tamper foot comprising an integral member with a lateral crosspiece and a plurality of parallel spaced toes extending longitudinally thereacross.

19. The invention according to claim 18 wherein each of said toes is upwardly apexed to form in vertical cross section an inverted V-shape.

20. The invention according to claim 18 wherein:

said frame has rigid support bar means extending across and above said compaction chamber;

said compaction driver means comprises a hydraulic cylinder rigidly secured to said support bar means and extending vertically upwardly therefrom and having a vertically reciprocal plunger with a lower end secured to said lateral crosspiece of said tamper foot; and said tamper foot has a pair of guide poles extending from said lateral crosspiece on opposite sides of said plunger vertically upwardly slidingly through guidance and alignment apertures in said support bar means.

21. The invention according to claim 13 wherein:

said door means comprises a pair of L-shaped doors forming in said closed position left and right sidewalls and a rear wall of said compaction chamber;

each door is pivotally mounted to said frame at its forward vertical edge and extends rearwardly to define a respective left or right sidewall and then inwardly to define half of the rear wall and meet the facing edge of the other door; and each door has upper and lower door supports extending laterally outwardly therefrom adjacent said forward edge of said door and pivotally mounted to said frame at upper and lower pivot points spaced laterally outward of the left and right vertical edges of said front wall of said compaction chamber.

22. The invention according to claim 21 wherein said frame comprises:

a pair of central vertical supports adjacent said forward edges of said doors; and upper and lower horizontal cross supports laterally bridging said central vertical supports and extending in front of said compaction chamber, said cross supports pivotally mounting said door supports;

and further comprising hydraulic cylinder means extending between a respective door and central vertical support for opening and closing said doors.

23. The invention according to claim 13 further comprising wheel means mounted to said frame, and hydraulic cylinder means mounted to said frame for raising and lowering said wheel means.

24. The invention according to claim 23 comprising guide structure for said wheel including a reception sleeve rigidly secured to said frame and a plunger member vertically telescopically reciprocal in said sleeve and guidingly aligned therein against lateral movement, the lower end of said plunger member being secured to said wheel means and the upper end of said plunger being secured to said hydraulic cylinder means.

25. The invention according to claim 13 wherein said conveyer means comprises:

a pair of parallel laterally spaced support tracks mounted to said frame below said compaction chamber and extending longitudinally forwardly and rearwardly thereof, said pallet resting on said support tracks;

a pair of sprocketed rollers, one at each end of said support tracks;

a pair of endless drive chains received on said rollers and extending longitudinally around said rollers along said support tracks, said drive chains lying below said compaction chamber, said drive chains being laterally spaced by a distance less than the lateral width of said compaction chamber; and hook means on said chains for advancing said pallet rearwardly.

26. The invention according to claim 25 further comprising pallet stacking means on said frame forwardly of said compaction chamber for stacking a plurality of pallets on said support tracks for engagement by said hook means of the bottom pallet of said stack for rearward advancement below said front wall of said compaction chamber.

27. A seed cotton compacter for field use comprising in combination:

a portable longitudinal structual frame having upper and lower rectangular sections joined by a plurality of vertical supports providing a rigid structure;

a vertical compaction chamber mounted on said frame between said upper and lower sections and comprising a stationary front wall and a pair of L-shaped doors forming left and right sidewalls and a rear wall of said compaction chamber, said doors having substantially vertical forward edges adjacent respective left and right edges of said front wall of said compaction chamber, said doors extending rearwardly to form respective left and right sidewalls of said compaction chamber and then extending inwardly to meet the opposing facing edge of the other door and form said rear wall of said compaction chamber, said compaction chamber having a bottom horizontal wall formed by a pallet;

attachment means pivotally mounting said doors to said frame adjacent said forward edges of said doors provide laterally outward and inward pivoting of said doors between open and closed positions about vertical pivot axes;

tamper means mounted to said upper section of said frame above said compaction chamber and vertically reciprocal for tamping seed cotton in said compaction chamber into a compact module with said doors in said closed position; and conveyor means mounted to said frame for advancing said pallet rearwardly through said doors in said open position for discharge of the compacted cotton module in said chamber and for advancing a pallet from a position forward of said compaction chamber rearwardly beneath said front wall of said compaction chamber to the position formerly occupied by said first mentioned pallet.

28. The invention according to claim 27 further comprising:

wheel means mounted to said frame to enable towing of said compacter; and hopper means mounted to said frame and having an open mouth for receiving seed cotton and a discharge opening which is forward of and above said compaction chamber for discharging said cotton into said compaction chamber from above at a point below the uppermost position of said tamper means.

29. The invention according to claim 27 further comprising a plurality of sensor means mounted to said frame and comprising in combination:

a tamper means sensor sensing a predetermined vertical travel stroke length of said tamper means which is less than the maximum travel stroke length, to indicate a corresponding predetermined height of the compacted cotton module in said compaction chamber;

one or more door sensors sensing said open and closed positions of said doors; and a pallet sensor sensing movement of said pallet past a given position.

30. The invention according to claim 29 further comprising hopper means mounted to said frame and comprising:

an open mouth for receiving seed cotton;

a collection box portion;

a rear discharge opening which is forwardly of and above said compaction chamber and below said tamper means in the uppermost position thereof; and longitudinally reciprocal push plate means for pushing cotton collected in said collection box portion rearwardly through said discharge opening into said compaction chamber;

and wherein said sensor means further comprises in combination a push plate sensor sensing rearward movement of said push plate to a discharging position.

31. A seed cotton compacter for field use comprising in combination:

a portable longitudinal frame;

a vertical compaction chamber mounted to said frame for receiving seed cotton;

said compaction chamber having an open top, a front wall rigidly secured to said frame, and door means forming left and right sidewalls and a rear wall of said compaction chamber, said door means being pivotal about a vertical axis between open and closed positions;

tamper means mounted to said frame above said compaction chamber and vertically reciprocal therein for tamping seed cotton in said compaction chamber into a compact module with said door means in said closed position;

conveyer means mounted to said frame and carrying a pallet to a position below said compaction chamber to form a horizontal bottom wall thereof, said conveyer means carrying said pallet rearwardly with said compact cotton module thereon through said door means in said open position.

32. The invention according to claim 31 wherein said tamper means comprises:

compaction driver means rigidly secured to said frame; and a tamper foot driven in vertical reciprocation in said compaction chamber by said compaction driver means, the vertical travel stroke of said tamper foot decreasing as the height of the cotton module in said compaction chamber increases.

33. The invention according to claim 32 wherein:

said frame has rigid support bar means extending across and above said compaction chamber;

said compaction driver means comprises a hydraulic cylinder rigidly secured to said support bar means and extending vertically upwardly therefrom, said hydraulic cylinder having a vertically reciprocal plunger with a lower end below said support bar means; and said tamper foot is secured to said lower end of said plunger and has guide pole means extending vertically upwardly from said tamper foot slidably through said support bar means for vertical reciprocation through and registered aligned guidance by said support bar means.

34. The invention according to claim 33 further comprising sensor means mounted to said frame above said compaction chamber and sensing a predetermined travel stroke length of said tamper foot indicating a predetermined height of the compacted cotton module in said compaction chamber.

35. The invention according to claim 34 wherein:

said guide pole means has trip means extending laterally therefrom and vertically spaced above said tamper foot;

said sensor means comprises electrical switch means mounted to said frame between said tamper foot and said trip means when said tamper means is in the uppermost position;

said electrical switch means has an actuator extending into the path of motion of said trip means such that said trip means trips said switch means during downward travel of said tamper foot below a given cotton module height; and a non-tripped condition of said switch means at the bottom of the travel stroke of said tamper foot indicates the cotton module has attained said predetermined height.

36. The invention according to claim 35 wherein:

said support bar means has a recessed aperture adjacent the portion thereof receiving said guide pole means;

said trip means has a vertical path of motion through said recessed aperture; and said switch means comprises a limit switch attached to said support bar means with an actuator lever arm extending laterally therefrom in vertical alignment with said recessed aperture in the path of motion of said trip means.

37. The invention according to claim 31 wherein:

said door means comprises a pair of L-shaped doors forming in said closed position said left and right sidewalls and said rear wall of said compaction chamber;

each door is pivotally mounted to said frame at its forward vertical edge and extends rearwardly to define a respective said left or right sidewall and then inwardly to define half of said rear wall and meet the facing edge of the other door; and each door has upper and lower door supports extending laterally outwardly therefrom adjacent to said forward edge and pivotally mounted to said frame at upper and lower pivot points spaced laterally outward of the left and right vertical edges of said front wall of said compaction chamber.

38. The invention according to claim 37 wherein:

said frame has a pair of central vertical supports adjacent said forward edges of said doors, which vertical supports are laterally bridged by upper and lower horizontal cross supports extending in front of said compaction chamber and to which are pivotally mounted said door supports;

and further comprising hydraulic cylinder means extending between a respective door and central vertical support for opening and closing said doors.

39. The invention according to claim 37 wherein the upper and lower pivot point attachments of said upper and lower door supports to said frame are vertically coaxial, and wherein the lateral dimension of said upper door support between its pivot point and said door is greater than the lateral dimension of said lower door support between its pivot point and said door.

40. The invention according to claim 31 further comprising:

wheel means mounted to said frame;

elevation driver means mounted to said frame for raising and lowering said wheel means; and guide structure for said wheel means including a reception sleeve rigidly secured to said frame and a plunger member vertically telescopically reciprocal in said sleeve and guidingly aligned therein against lateral movement, the lower end of said plunger being secured to said wheel means and the upper end of said plunger secured to said elevation driver means.

41. The invention according to claim 31 wherein said conveyer means comprises:

a pair of parallel laterally spaced channel-shaped support tracks mounted to said frame below said compaction chamber and extending longitudinally forwardly and rearwardly thereof, said pallet resting on said support tracks;

a pair of sprocketed rollers, one at each end of said support tracks;

a pair of endless drive chains received on said rollers and extending longitudinally around said rollers and through said channel-shaped support tracks, said drive chains lying below said compaction chamber and laterally spaced by a distance less than the lateral width of said compaction chamber; and hook means on said chains for advancing said pallet rearwardly.

* * * * *

UNITED STATES PATENT AND TRADEMARK OFFICE
CERTIFICATE OF CORRECTION

PATENT NO. : 4,294,169
DATED : October 13, 1981
INVENTOR(S) : Charles D. Baird

It is certified that error appears in the above-identified patent and that said Letters Patent are hereby corrected as shown below:

Col. 7, line 62, "forwrd" should be --forward--.
Col. 12, line 9, after "wheel" insert --means--.

Signed and Sealed this

Nineteenth Day of January 1982

[SEAL]

Attest:

*Attesting Officer*

GERALD J. MOSSINGHOFF

*Commissioner of Patents and Trademarks*